Oct. 4, 1938.   H. S. HOLMES   2,131,889
PEDAL
Filed May 1, 1936   3 Sheets-Sheet 2
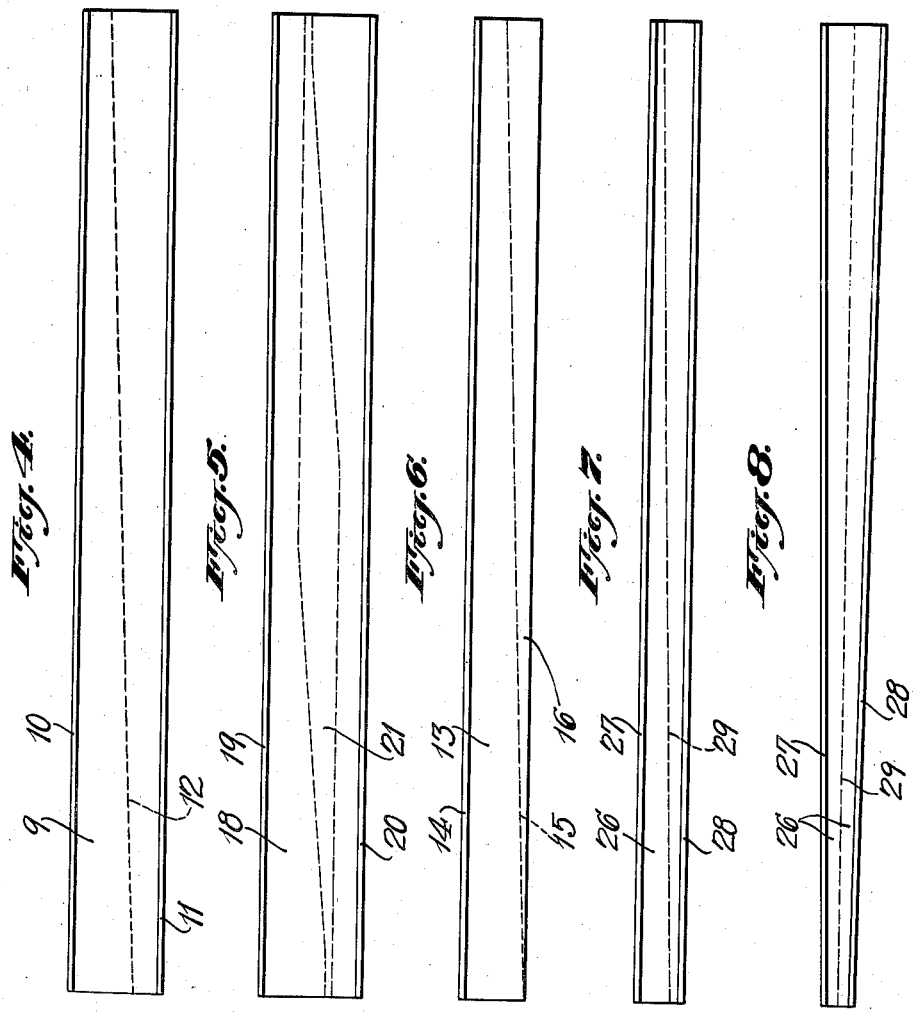
INVENTOR.
HENRY S. HOLMES.
BY
ATTORNEYS

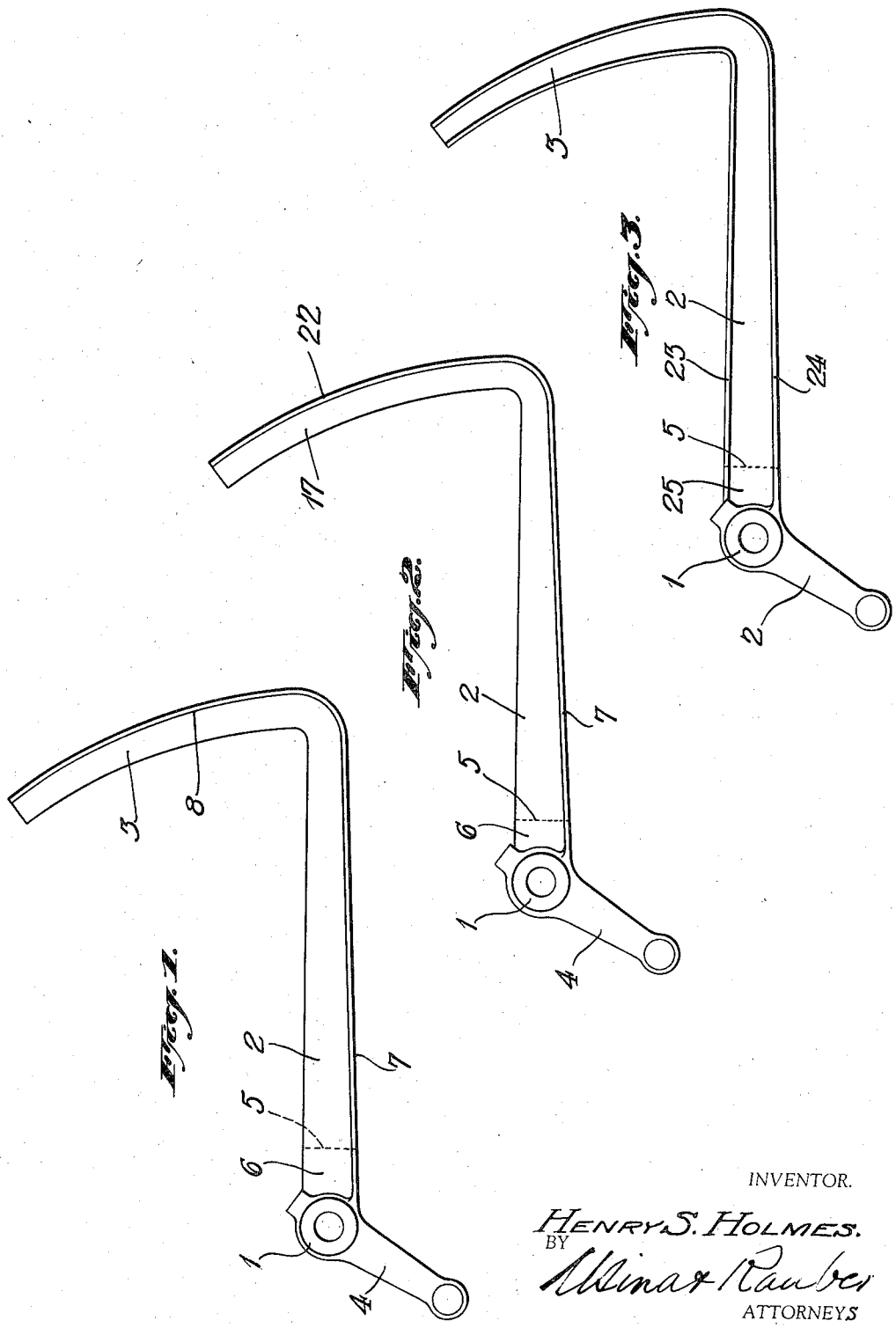

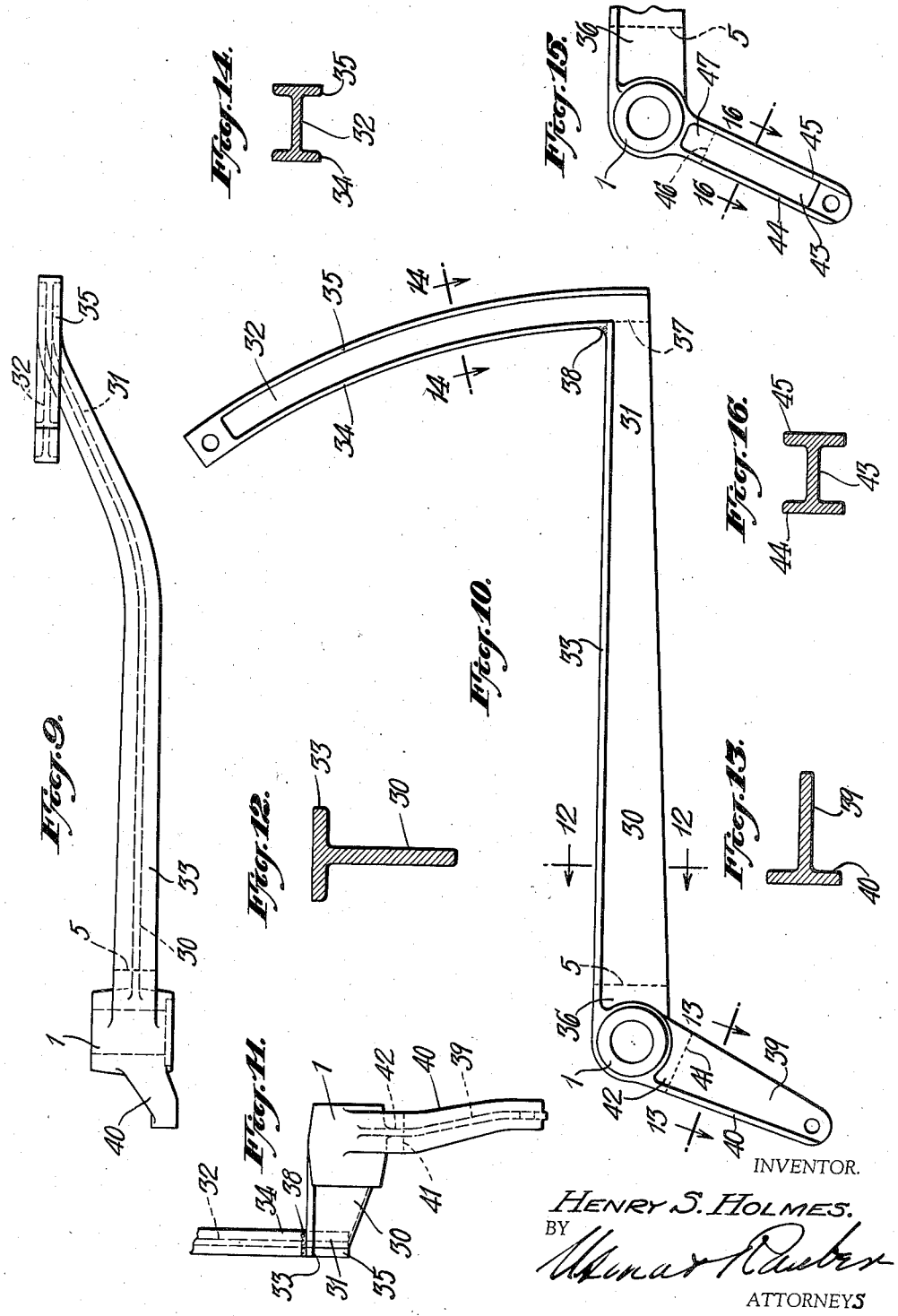

Patented Oct. 4, 1938

2,131,889

UNITED STATES PATENT OFFICE 2,131,889

PEDAL

Henry S. Holmes, Brooklyn, N. Y., assignor to Metropolitan Engineering Company, Brooklyn, N. Y., a corporation of New York Application May 1, 1936, Serial No. 77,295

7 Claims. (Cl. 74—560)

The invention aims to provide an improved pedal of the type generally used for brakes and clutches of motor cars. The improvement effects a saving in cost and a reduction in weight as compared with the pedals used heretofore, which generally have been of forged steel.

The accompanying drawings illustrate embodiments of the invention.

Figs. 1, 2 and 3 are side elevations illustrating different modifications. Figs. 4 and 4ª are side and end views of a rolled section which may be used in making the pedal of Fig. 1. Figs. 5 and 5ª are similar views related to the pedal of Fig. 2. Figs. 6 and 6ª are similar views related again to the pedal of Fig. 1. Figs. 7, 7ª, 8 and 8ª are similar views related to the pedal of Fig. 3. Figs. 9, 10 and 11 are respectively a plan, side elevation and end elevation of a modified pedal. Figs. 12, 13 and 14 are sections on the correspondingly numbered lines of Fig. 10. Fig. 15 is a side elevation of a modification of the hub end of Fig. 10. Fig. 16 is a cross-section of the same on the line 16—16 of Fig. 15.

Referring first to Fig. 1, the pedal comprises a hub 1, a power arm having a portion 2 which extends approximately horizontally forward from the hub and a portion 3 which extends upward and rearwardly in the arc of an approximate circle around the center of the hub; and a work arm 4 extending downwardly at an angle to the horizontal arm. The operator's foot presses downward and forward on the upper end of the arm 3. The pedal is pivoted at the hub. The work arm 4 is connected by appropriate linkage to the brake or clutch.

Heretofore such pedals, being of complicated shape and requiring strength and security against breakage, have been made of forgings. By the present invention they are made partly of a metal section having a web and one or more flanges, which section can be made by rolling much more cheaply than a forging and can be made of such shape as to save considerable weight compared with the previous forgings used, while retaining the same strength and reliability.

In Figs. 1, 2 and 3 it is only the power arm and the upright end which are made of a rolled metal section. They are made of one piece and welded along the line 5 to a stub 6 forming part of the forging which includes also the hub 1 and the work arm 4.

The power arm is of T-section, having a double flange 7, 8 extending along the underside of the horizontal portion and the forward side of the upright portion so as to stiffen these parts laterally as well as increase the resistance to flexure in the horizontal part and to the compression and flexure stresses in the upright part.

The power arm is tapered from the large end, which is welded to the hub where the maximum stress occurs, to the small upper end where the power is applied.

An economical method of producing such an arm is illustrated in Figs. 4 and 4ª. A rolled I-beam having a web 9 and double flanges 10 and 11 at top and bottom is sheared along the oblique line 12 to produce two identical tapered pieces of T-section, either one of which may be used; bending it into the shape of the parts 2 and 3 of Fig. 1.

Or, a rolled section (Fig. 6) having a web 13 and a double flange 14 may be sheared along the oblique line 15, choosing a shape which originally is of the maximum depth required and cutting off a flat triangular scrap 16. The flanged portion can be used in the same way as the tapered halves of the I-beam of Fig. 4.

The stresses in the part 2 of the power arm increase gradually from its outer end to the weld point 5. But in the upright arm the stresses are substantially the same throughout its length. Economy of weight is effected, therefore, by the shape of Fig. 2 in which the upright arm 17 is of uniform depth and cross-section throughout its length.

The power arm for this shape may be made from an I-beam 18, Fig. 5, with flanges 19 and 20, shearing out a piece of scrap 21 of such shape as to leave two long pieces with the web tapering for a length corresponding to the horizontal portion and the web of uniform depth throughout the remainder of the length. This is then bent to the shape shown in Fig. 2, the portion of tapered depth constituting the horizontal member 2 with the flange 7 and the portion of uniform depth constituting the upright arm 17 with the flange 22, a continuation of the flange 7.

Fig. 3 illustrates a pedal, the arm of which is tapered as in Fig. 1 from the welded end of the horizontal portion 2 to the upper end of the upright portion 3; differing from the pedal of Fig. 1 in that these parts carry flanges 23, 24 at top and bottom. The stub 25 of the forging which constitutes the hub differs from the stub 6 in Fig. 1, it also having a pair of flanges to meet the flanges 23 and 24 at the welded joint 5.

This power arm may be made from an ordinary rolled I-beam, Fig. 7, having a web 26 and flanges 27 and 28. The web is sheared along the oblique line 29. The parts are reversed end to end with relation to each other as in Fig. 8 and welded together along the edges 29 so that the web will be of the desired tapered shape from end to end when bent as illustrated in Fig. 3.

In the above described examples, it has been assumed that the whole of the power arm as well as the work arm lie in one vertical plane. But the structures are often complicated by a departure in this and other respects.

Figs. 9 and 10 illustrate a pedal in which the power arm comprises an approximately horizontal portion 30 which has an outer front end portion 31 bent to the left. From the outer end rises the upright curved portion 32. The horizontal portion is of T-shape with a double flange 33 on one edge only. The upright portion 32 is of I-shape with identical opposite flanges 34, 35.

The arm is welded at 5 to a stub 36 of the forged hub 1; its web and also its flange tapering toward the outer end so that at that end its flange 33 is of the same width as the flange 34 of the upright member. Parts of the flange 34 are sheared from the lower end of the upright member, where it is welded to the end of the horizontal member preferably by a butt weld 37. The joint may be reinforced by an arc weld 38 between the flanges 33 and 34.

This design shows another departure from that of the previous figures in that the work arm comprises a rolled member 39 of T-shape with a double flange 40 on one edge and is butt welded at 41 to a correspondingly shaped stub 42 on the hub forging. The members 30 and 39 of this pedal may be made from rolled tees or split I-beams sheared to the shapes illustrated.

The work arm instead of being T-shape, may be of I-shape as in Figs. 15 and 16, having a web 43 with double flanges 44 and 45 on the opposite edges and welded at 46 to a correspondingly shaped stub 47 on the hub forging 1.

Pedals according to this invention are shaped in accordance with the variation in the stresses at different points so as to provide approximately uniform unit stresses. The flanges give the necessary lateral stiffness. The welds, according to modern practice can be made of equal strength with the adjacent parts. The whole article is of substantially less weight than those previously in general use.

There is economy in two respects. The expensive forging is reduced to a small part of the whole article, the hub and short work arm in Figs. 1, 2 and 3, and the hub alone in Figs. 10 and 15. The flanged arms or parts thereof are made of a very much cheaper product, rolled steel, which, however, is produced of great uniformity and desired strength.

The idea of using flanged rolled sections may be applied in a variety of ways besides those illustrated in the several drawings.

Various other modifications may be made by those skilled in the art without departing from the invention as defined in the appended claims.

What I claim is:

1. A pedal for automobile brakes and the like comprising a hub, a power arm having a portion extending approximately horizontally and a portion extending upward from one end of said horizontal portion, both of which portions are of flanged rolled metal sections, and a work arm extending from said hub at an angle to the horizontal arm, said power arm being welded at its other end to the hub.

2. A pedal for automobile brakes and the like comprising a hub, a power arm having a portion extending approximately horizontally and a portion extending upward from one end of said horizontal portion and a work arm extending from said hub at an angle to the horizontal arm, said power arm consisting of a rolled metal section having a web and flange, said web diminished in depth at the end remote from the hub and said arm being welded at its other end to the hub.

3. A pedal for automobile brakes and the like comprising a hub, a power arm having a portion extending approximately horizontally and a portion extending upward from one end of said horizontal portion, both of which portions are of flanged rolled metal sections, and a work arm extending from said hub at an angle to the horizontal arm, said power arm being welded at its other end to the hub, said work arm also consisting of a rolled metal section with a web and flange and being welded at one end to the hub.

4. A pedal for automobile brakes and the like comprising a forging forming a hub with a work arm and a flanged stub at an angle thereto, and a power arm of rolled steel of flanged cross-section corresponding to that of the stub and welded at one end to said stub.

5. A pedal for automobile brakes and the like comprising a forging forming a hub with flanged stubs extending therefrom at different angles, a power arm of rolled steel welded at its end to one of said stubs and a work arm of rolled steel welded at its end to the other, said arms being of flanged cross-sections corresponding to that of the stubs.

6. A pedal for automobile brakes and the like comprising a hub, a power arm having a portion extending approximately horizontally and a portion extending upward from the end of said horizontal portion, both of which portions are of flanged rolled metal sections, said upward portion being welded to one end of said horizontal portion and the hub being welded to the other end of said horizontal portion.

7. A pedal for automobile brakes and the like comprising a hub, a power arm having a portion extending approximately horizontally and a portion extending upward from the end of said horizontal portion, said upward portion being welded to one end of said horizontal portion and the hub being welded to the other end of said horizontal portion, and a work arm also separately formed and welded to the hub, the work arm and the portions of the power arm being of flanged rolled metal sections.

HENRY S. HOLMES.